US008318130B2

(12) United States Patent
Grimes et al.

(10) Patent No.: US 8,318,130 B2
(45) Date of Patent: Nov. 27, 2012

(54) HYDROGEN PRODUCTION USING ELECTROCHEMICAL REFORMING AND ELECTROLYTE REGENERATION

(75) Inventors: Patrick G. Grimes, Scotch Plains, NJ (US); Maureen A. Grimes, legal representative, Scotch Plains, NJ (US); Richard J. Bellows, Woodland, CA (US)

(73) Assignees: COP Energy Technologies LLC, Houston, TX (US); GRDC, LLC, Westfield, NJ (US)

( * ) Notice: Subject to any disclaimer, the term of this patent is extended or adjusted under 35 U.S.C. 154(b) by 797 days.

(21) Appl. No.: 11/922,549

(22) PCT Filed: Jun. 23, 2006

(86) PCT No.: PCT/US2006/024645
§ 371 (c)(1),
(2), (4) Date: Jul. 15, 2009

(87) PCT Pub. No.: WO2007/002503
PCT Pub. Date: Jan. 4, 2007

(65) Prior Publication Data
US 2009/0266717 A1    Oct. 29, 2009

Related U.S. Application Data

(60) Provisional application No. 60/693,316, filed on Jun. 23, 2005.

(51) Int. Cl.
*C01B 3/02* (2006.01)
(52) U.S. Cl. .................................... 423/648.1; 205/637
(58) Field of Classification Search ................ 423/648.1; 205/637
See application file for complete search history.

(56) References Cited

U.S. PATENT DOCUMENTS

| | | | |
|---|---|---|---|
| 1,783,901 A | | 12/1930 | Bottoms |
| 2,840,450 A | | 6/1958 | Giammarco |
| 2,886,405 A | | 5/1959 | Benson et al. |
| 3,086,838 A | | 4/1963 | Giammarco |
| 3,144,301 A | | 8/1964 | Mayland |
| 3,520,823 A | | 7/1970 | Slater |
| 3,965,253 A | * | 6/1976 | Miller et al. .................. 423/652 |
| 4,117,079 A | | 9/1978 | Bellows |
| 5,248,566 A | | 9/1993 | Kumar et al. |
| 5,762,658 A | | 6/1998 | Edwards et al. |

(Continued)

FOREIGN PATENT DOCUMENTS

CA        787831       6/1968
(Continued)

OTHER PUBLICATIONS

Perry's Chemical Engineers Handbook, $71^{TH}$ edition, McGraw Hill, Fig. 27-52-27-59 (1997).

(Continued)

*Primary Examiner* — Nicholas A. Smith
(74) *Attorney, Agent, or Firm* — Richard Y. Yuen

(57) ABSTRACT

A process, preferably continuous, for producing hydrogen gas comprising contacting in the liquid phase at least one oxidizable organic substance in the presence of a mixture comprising at least one conductive catalyst and an aqueous alkaline carbonate electrolyte, wherein at least one bicarbonate composition produced by reaction of the electrolyte is regenerated and the at least one oxidizable organic substance comprises a oxygenated hydrocarbon, for example methanol and/or dimethyl ether. In a preferred embodiment the alkaline electrolyte is regenerated using steam. Various advantageous reaction schemes are described, utilizing, e.g., co-current and countercurrent stream flow and alternative tower sequence arrangements.

20 Claims, 8 Drawing Sheets

U.S. PATENT DOCUMENTS

| | | | |
|---|---|---|---|
| 6,036,840 A | 3/2000 | Christensen |
| 6,099,621 A | 8/2000 | Ho |
| 6,387,554 B1 | 5/2002 | Verykios |
| 6,596,423 B2 | 7/2003 | Mahajan |
| 6,605,376 B2 | 8/2003 | Verykios |
| 6,607,707 B2 | 8/2003 | Reichman et al. |
| 6,699,457 B2 | 3/2004 | Cortright et al. |
| 6,834,623 B2 | 12/2004 | Cheng |
| 6,890,419 B2 | 5/2005 | Reichman et al. |
| 6,953,873 B2 | 10/2005 | Cortright et al. |
| 6,964,757 B2 | 11/2005 | Cortright |
| 6,964,758 B2 | 11/2005 | Cortright |
| 6,994,839 B2 | 2/2006 | Reichman et al. |
| 7,481,992 B2 | 1/2009 | Reichman et al. |
| 7,588,676 B2 | 9/2009 | Reichman et al. |
| 2002/0132155 A1* | 9/2002 | Shikada et al. ............ 429/40 |
| 2003/0044349 A1* | 3/2003 | Reichman et al. ........... 423/650 |
| 2003/0099593 A1 | 5/2003 | Cortright et al. |
| 2003/0194368 A1 | 10/2003 | Devos et al. |
| 2003/0198852 A1 | 10/2003 | Masel et al. |
| 2003/0204102 A1 | 10/2003 | Weisbeck et al. |
| 2003/0219641 A1 | 11/2003 | Petillo |
| 2004/0028603 A1 | 2/2004 | Reichman et al. |
| 2004/0188248 A1 | 9/2004 | Sawa |
| 2005/0163704 A1 | 7/2005 | Reichman et al. |
| 2005/0163706 A1 | 7/2005 | Reichman et al. |
| 2005/0207971 A1 | 9/2005 | Cortright et al. |

FOREIGN PATENT DOCUMENTS

| | | |
|---|---|---|
| CA | 2144248 | 3/1995 |
| DE | 162655 | 9/1905 |
| EP | 0299995 | 10/1991 |
| GB | 725000 | 3/1955 |
| JP | 57067003 | 4/1982 |
| RU | 2008102365 | 7/2009 |
| WO | WO 99/54950 | 10/1999 |
| WO | WO 0204347 | 1/2002 |
| WO | WO 03045841 | 5/2003 |
| WO | WO 2007002502 | 1/2007 |
| WO | WO 2007002504 | 1/2007 |

OTHER PUBLICATIONS

Bergens, S.H., et al., A Redox Fuel Cell That Operates with Methane as Fuel at 120° C., 1994, Science 265:1418-1420.

Kitk-Othimer Encyclopedia of Chemical Technology, Fourth Edition, vol. 5, 1993, p. 43-53 (Carbon Dioxide), John Wiley & Sons.

Kohl, Arthur, et al., Gas Purification, Third Edition, 1979, pp. 158-161 and 187-220 (Alkaline Salt Solutions for Hydrogen Sulfide and Carbon Dioxide Absorption, Gulf Publishing Company.

Vanderborgh, N.E., et al., Methanol Fuel Processing for Low-Temperature Fuel Cells (publication information unknown).

* cited by examiner

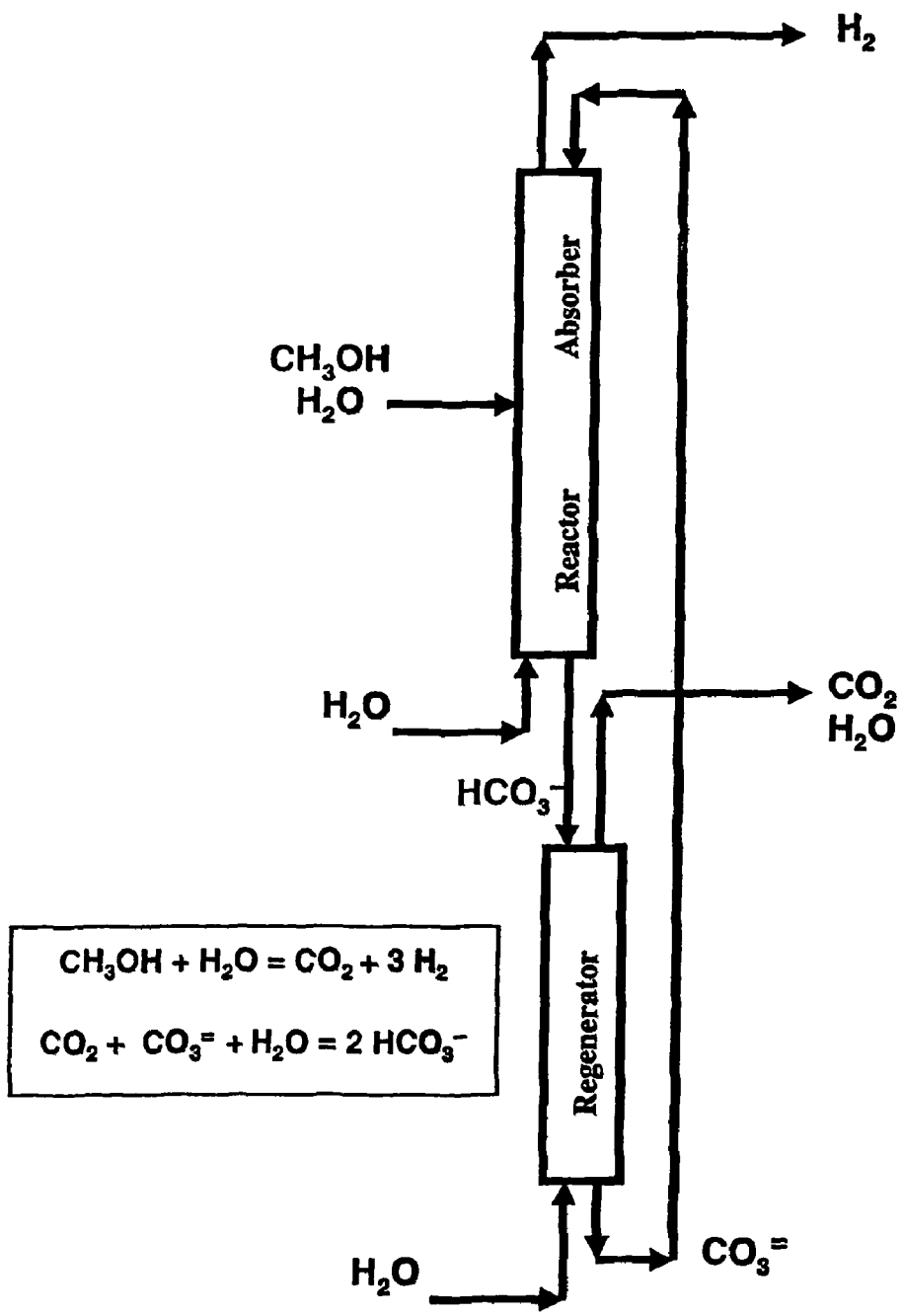

Figure 7

Comparison of Catalyst Activity in 45 wt% KOH

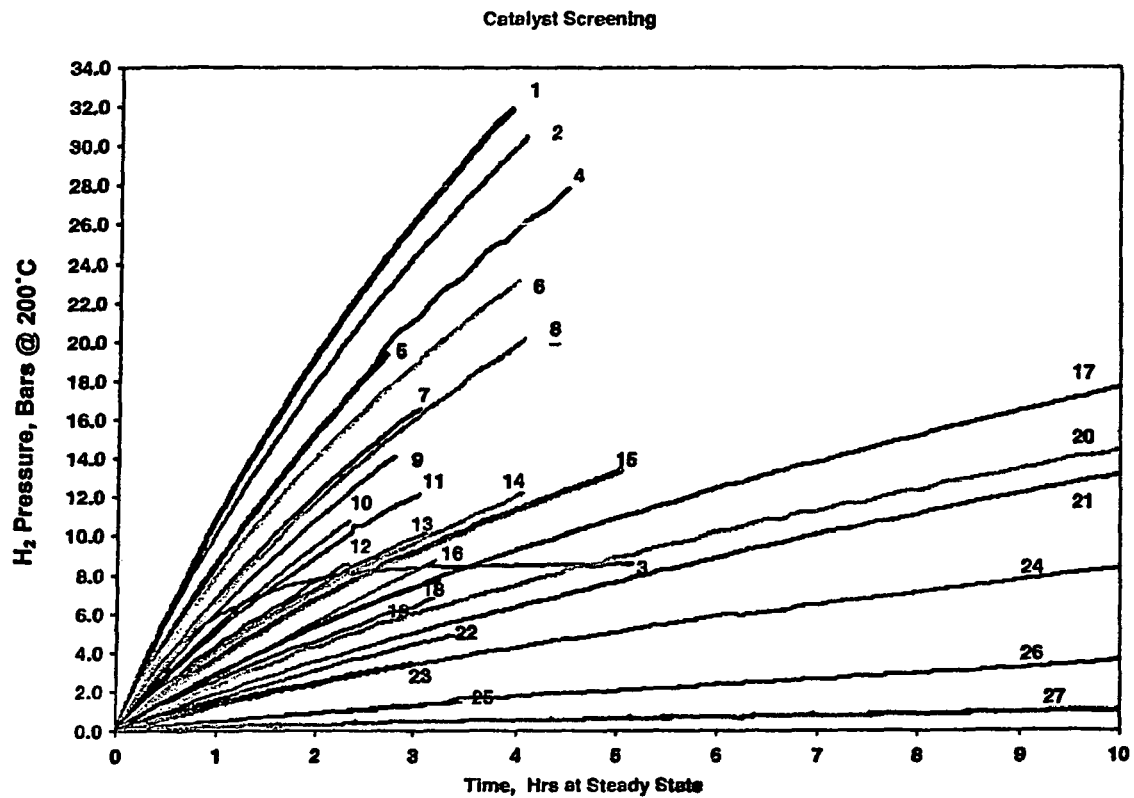

| Curve # | Catalyst | Curve # | Catalyst |
|---|---|---|---|
| 1 | 204.1mg Pt_Act C Granules | 15 | 11.43mg Pt_4xComp Ni Foam Chads |
| 2 | 200mg Pt_Act C Powder | 16 | 4.9g 60% Ni on Graphite |
| 3 | 1070.2mg Pt_Act C Powder 0.4xCharge | 17 | 5.0g Ni 255 |
| 4 | 5.0g Ni 210H Vary Agitation | 18 | 5.0g 10% Pt & Pd Covered Ni 255 |
| 5 | 5.0g Ni 210H | 19 | 5.1g Ni 123 |
| 6 | 26.7g 50% Pt Coated 4SP-10 | 20 | 4.9g Acid Washed Ni 255 |
| 7 | 5.8g 50% Pt Covered Ni 255 | 21 | 4.8g 10% Pd Covered Ni 255 |
| 8 | 26g 50% Pt on 4SP-10 Recy 1x | 22 | 0.68g 50% Pt & Pd Covered Ni 210H |
| 9 | 5.0g Ni 210 | 23 | 5.0g Ni 4SP-10 Spheres |
| 10 | Pt on C 200mg | 24 | 11.7g 100% Pt Coated Ni Foam |
| 11 | 5.8 g 50% Pt & Pd Covered Ni 255 | 25 | 5.0g 15% Silver on Nickel Spheres |
| 12 | Raney 2800, 160 mg Dry | 26 | 12.0g PreCleaned Ni Foam, Fresh |
| 13 | 5.1g HCA-1 Ni Flake Pigment | 27 | 12.4g 110PPI Ni Foam |
| 14 | COP 20% Pt on C, 240mg | | |

Hydrogen Generation in Fresh and Regenerated Carbonate Electrolyte
(Pt/C Catalyst)

HYDROGEN PRODUCTION USING ELECTROCHEMICAL REFORMING AND ELECTROLYTE REGENERATION

CROSS-REFERENCE TO RELATED APPLICATIONS

This application claims the benefit of the filing date of U.S. Provisional Patent Application No. 60/693,316 filed Jun. 23, 2005, the disclosure of which is hereby incorporated herein by reference.

BACKGROUND OF THE INVENTION

This invention relates to processes for producing hydrogen gas.

There is a need for new low cost routes to hydrogen production. Hydrogen is widely used as an intermediate in the petrochemical industry. The largest single use is in the refining of crude oil into fuels. Hydrogen is also an intermediate in the production of ammonia for fertilizers. Many companies are working on hydrogen fuel cells as a replacement for gasoline or diesel fueled vehicles. If this fuel cell development is successful, large additional supplies of hydrogen will be needed for hydrogen to power fuel cell vehicles.

Gas phase steam reforming of natural gas is commonly used to make low cost hydrogen. Methane is the majority component in natural gas. However, the kinetics of methane steam reforming are slow. As a result, this reaction is conducted at high temperatures, typically 600° C.-900° C. An equation for the steam reforming of methane is given in reaction (1).

$$CH_4 + 2H_2O(vapor) \rightarrow CO_2 + 4H_2 \quad (1)$$

Other oxidizable fuels have also been steam reformed to make hydrogen. Equations similar to (1) can be written for the steam reforming of other hydrocarbons, oxygenates and various other oxidizable fuels. For example, the steam reforming of methanol is given by reaction (2). Methanol steam reforming proceeds at a much faster rate than methane steam reforming. Typical gas phase methanol steam reforming temperatures are 250° C.-350° C.

$$CH_3OH(vapor) + H_2O(vapor) \rightarrow CO_2 + 3H_2 \quad (2)$$

The typical steam reforming product, known as synthesis gas, is a mixture of hydrogen, carbon monoxide, carbon dioxide and steam. In most applications, the synthesis gas is passed sequentially through one or more "water gas shift" reactors, where most of the carbon monoxide is reacted with steam making additional hydrogen and carbon dioxide via reaction (3).

$$CO + H_2O(vapor) \rightarrow CO_2 + H_2 \quad (3)$$

Finally, purification steps are used to remove the carbon dioxide, carbon monoxide, steam and other impurities. Hydrogen product purity requirements vary widely depending on the final hydrogen usage application.

Current energy markets are in a state of flux. In recent years, the supply of domestic natural gas has been limited and its price has increased several-fold over historic levels. Offshore natural gas is viewed as a low cost alternative to expensive domestic natural gas. Unfortunately, most offshore natural gas cannot be transported via gas pipelines. Many companies are considering the use of tankers to transport liquefied natural gas (LNG). LNG tankers are much more expensive than petroleum tankers. Furthermore, transport of LNG poses serious safety and liability issues in the event of a spill in a waterway. Others view the shipment of liquids such as methanol or dimethyl ether as viable alternatives to LNG. Both fuels can utilize less expensive tankers and in the event of a spill, these materials are not subject to the same safety issues presented by a LNG spill. If these fuels become widely available, their prices may fall below that of domestic natural gas and these liquid fuels can be attractive alternative feedstocks for the production of hydrogen. Both fuels can be processed in the gas phase by steam reforming. The resulting synthesis gas can similarly be processed sequentially, as described above, using well known water gas shift reactors and hydrogen purification processes.

An early patent in this field, Canadian Patent No. 787831 (Jun. 18, 1968), P. Grimes et al., teaches a liquid phase process for making hydrogen by reforming various oxidizable fuels. Liquid phase reforming can be conducted in various aqueous electrolytes but the reforming kinetics are more favorable in alkaline electrolytes, especially hydroxides. Conductive catalysts are used to promote reforming reactions by activating electrochemical pathways. Preferred catalysts are from the Group VIIIA transition metals. Reaction (4) describes the overall liquid phase reforming of methanol to produce hydrogen.

$$CH_3OH(liquid) + H_2O(liquid) \rightarrow CO_2 + 3H_2 \quad (4)$$

The patent discloses a batch process using a mixture of water, an ionic conductive electrolyte, and an organic compound (fuel) which react in the presence of an electronic conductive catalyst, oxidizing the fuel and producing hydrogen. The reactions are said to occur in the liquid phase and are believed to proceed via electrochemical pathways. Thus for convenience herein, this type of liquid phase reforming in alkaline electrolytes is referred to as electrochemical reforming (ECR). Alcohol and a wide range of organic fuels, including biomass, are disclosed. High-pressure hydrogen production is disclosed and hydroxides are described as preferred electrolytes.

Recent patents to Cortright et al., U.S. Pat. Nos. 6,964,757, 6,699,457, and 6,964,758 and published U.S. Patent Application 20050207971, and Reichman et al., U.S. Pat. Nos. 6,890,419 and 6,994,839 and published U.S. Patent Application 20050163704 are similar in many respects to the disclosure in Grimes. These include liquid phase reforming of alcohols, sugars, biomass, hydrocarbons and various oxygenated hydrocarbons to make hydrogen. These patents and published applications disclose the use of various ionic conducting electrolytes in the liquid phase and the use of conductive metal catalysts from Group VIII and related catalysts. The processes disclosed by Cortright et al., are conducted at pH<10, where the by-product generally carbon dioxide leaves as an impurity with the product hydrogen. U.S. Pat. No. 6,994,839 and published U.S. Patent Application 20050163704 further disclose that alkali hydroxide electrolytes are converted in a batch process to less active alkali carbonate and bicarbonates and that the spent electrolyte can be regenerated using a three step process: (1) make an alkali carbonate solution via liquid phase reforming in alkali hydroxide; (2) treat the alkali carbonate with a solid alkaline earth oxide/hydroxide to regenerate the caustic while precipitating an alkaline earth carbonate; and (3) use heat to regenerate the alkaline earth carbonate to an oxide for re-use in step (2). However, this approach is economically unfavorable because significant heat is required to regenerate alkaline earth oxide/hydroxide reactants resulting in significant cost.

U.S. Pat. No. 6,607,707 discloses that hydrogen can be produced by combining an alcohol such as methanol with a base and further in the presence of a catalyst such as a transition metal and wherein the pH of the mixture is "at least 10.3," but nothing specific is provided beyond that limited disclosure.

U.S. Pat. No. 6,890,419 discloses an electrochemical cell consisting of anode and cathode electrodes across which an external voltage is impressed and employing acidic to strongly basic electrolyte solutions, including the use of KOH up to 12M, in order to effect production of hydrogen.

Liquid phase reforming provides desirable advantages over conventional steam reforming because liquid phase reforming offers electrochemical pathways that are not accessible in conventional gas phase steam reforming.

Advantages include:
1. Higher efficiency than steam reforming;
2. Simplified product clean-up;
3. Eliminate the need for compressors; and
4. Provide a continuous, fully integrated process.

SUMMARY OF THE INVENTION

A process for producing hydrogen gas comprising contacting in the liquid phase at least one oxidizable organic substance in the presence of a mixture comprising at least one conductive catalyst and an aqueous alkaline carbonate electrolyte, wherein at least one bicarbonate composition produced by reaction of the electrolyte is regenerated and the at least one oxidizable organic substance comprises a oxygenated hydrocarbon, for example methanol and/or dimethyl ether. In a preferred embodiment the process for producing hydrogen gas comprises contacting in the liquid phase at least one oxidizable organic substance, such as methanol, in the presence of a conductive catalyst and an alkaline electrolyte, wherein: (A) hydrogen gas is generated in a reactor having a top and bottom, wherein the at least one oxidizable organic substance is introduced into said reactor at a point substantially midway between said top and bottom; (B) an alkaline electrolyte solution comprising at least one metal carbonate is introduced into the reactor at a point substantially at the top of the reactor such that the metal carbonate solution and the hydrogen gas flow substantially countercurrent to one another, thereby resulting in the production of at least one metal bicarbonate composition; (C) the at least one metal bicarbonate composition is regenerated. In one regeneration process or step used in conjunction with the hydrogen production sequence, the alkaline electrolyte is regenerated using steam.

BRIEF DESCRIPTION OF THE DRAWINGS

FIG. 6 shows a schematic of a liquid phase reformer in a close-coupled counter-current integration with a hot carbonate process for removing carbon dioxide from product hydrogen and for regenerating spent reformer electrolyte.

FIG. 7 shows rate comparison data using a series of catalysts for hydrogen generation from methanol in KOH electrolyte.

DETAILED DESCRIPTION

Figure 1:
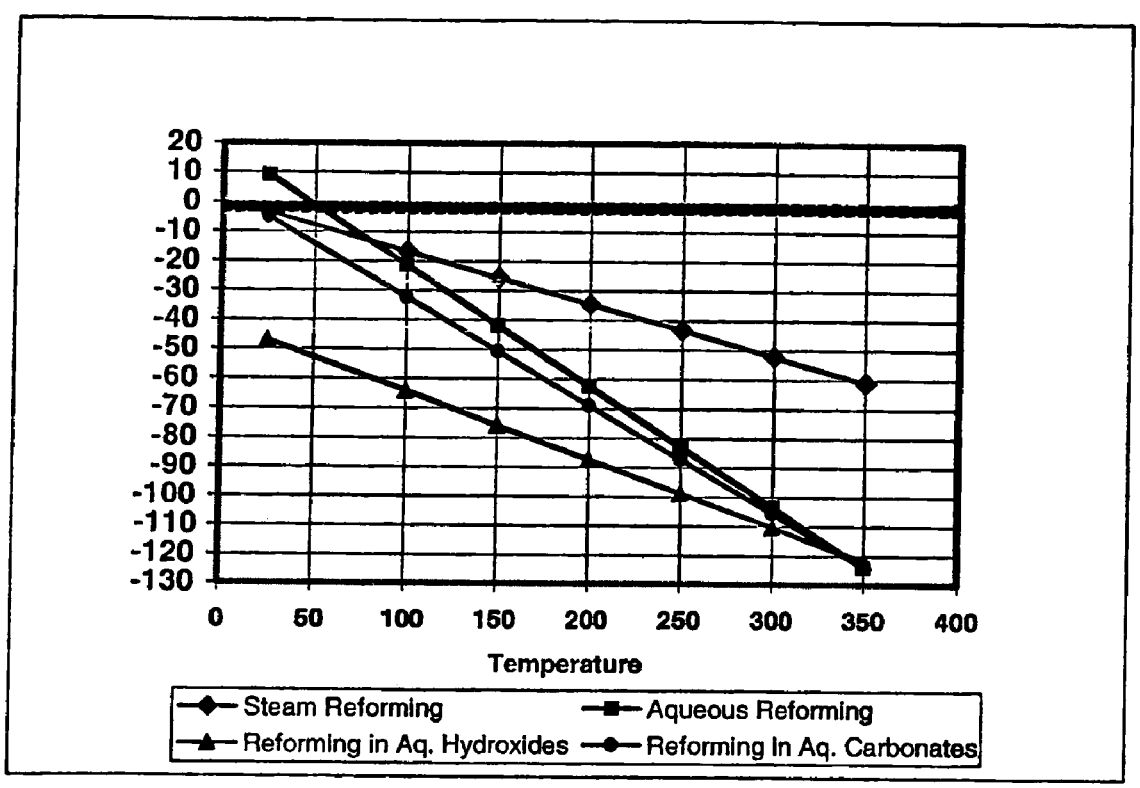
FIG. 1 compares the energetics of steam reforming with liquid phase reforming in various alkaline media.

As described earlier, there is a need for a liquid process that reforms oxidizable fuels to produce high-pressure, high purity hydrogen without adding fresh alkaline electrolyte. Unfortunately, prior art processes disclosing liquid phase reforming are not economically feasible for at least the following reasons:

The cost of making hydrogen in alkaline reforming is effectively determined by the price of the caustic reagent rather than by the price of the oxidizable fuel, when such processes are conducted in alkaline electrolyte, for example at pH>7, or pH>9, such as pH of about 7 to about 12. Although strongly alkaline electrolytes (for example, pH>13) can produce relatively pure hydrogen with low levels of carbon dioxide and carbon monoxide, the product purity is achieved because the carbon dioxide by-product reacts immediately with the alkaline electrolyte, rapidly converting the electrolyte into a bicarbonate-rich mixture thereby reducing the pH and the reaction rate. In order to effectively and efficiently conduct the process in an alkaline electrolyte, particularly a continuous process at high pH, it thus becomes necessary to add fresh caustic electrolyte along with fresh oxidizable fuel. At current prices, the cost of makeup caustic, whether in the form of a metal hydroxide or metal carbonate, far exceeds the cost of the oxidizable fuel being reformed. Consequently, the price of the caustic controls the product price, which is unfavorable.

On the other hand, if the prior art processes are conducted in acidic or neutral electrolytes (for example, pH<7), the hydrogen product requires additional cleanup processing. These cleanup processes add cost and reduce process yield. In acidic or neutral electrolytes, the carbon dioxide by-product does not react with the electrolyte. As a result, a continuous process can be run in neutral or acidic electrolytes without the need to add fresh electrolyte with additional fuel. However, the reforming rates are lower than in alkaline electrolytes, and, more importantly, the carbon dioxide leaves the process in the product hydrogen, requiring significant cleanup and the associated costs. In addition, the carbon dioxide and hydrogen can react via the reverse of reaction (3) above to produce carbon monoxide, and under some conditions, hydrogen and carbon dioxide can further react to form methane. All of these impurities must be removed in subsequent water gas shift and/or purification processes. The cost of cleanup processes and hydrogen yield losses can thereby unfavorably affect the hydrogen production cost.

Alternatively, if the prior art processes are conducted in mildly alkaline electrolytes (for example, pH<10), the hydrogen product also requires additional cleanup processing. In this case alkali carbonates are quickly converted to bicarbonates, dropping the pH. As pH drops below 7, carbon dioxide again becomes a serious impurity in the product hydrogen. A significantly higher pH can only be maintained by the continuous addition of a caustic reagent. In this case, the cost of making hydrogen is again controlled by the more expensive caustic reagent rather than by the fuel.

As is described in detail below, the present invention provides embodiments for continuous methods of producing pressurized hydrogen from oxidizable materials via liquid phase reforming in an alkaline carbonate electrolyte and then regenerating the electrolyte so that the electrolyte can be reused, thereby avoiding the negative impacts described above. The oxidizable fuel is reacted with an aqueous electrolyte in a high temperature liquid phase process in the presence of a suitable catalyst. Furthermore, there are several alternative and suitable ways of integrating the reforming step with the electrolyte regeneration step.

The present invention relates to processes for producing hydrogen gas and includes several alternative embodiments. For example, one embodiment relates to batch or continuous processes for the production of hydrogen gas from oxidizable organic substances utilizing reactions with an alkaline electrolyte and for the regeneration of that electrolyte. In another embodiment, this invention relates to the continuous production of high-pressure hydrogen gas utilizing reactions with an oxygenated hydrocarbon such as a lower alcohol, e.g., methanol, or an ether such as dimethyl ether or mixtures of alcohols and ethers, with an alkaline electrolyte and the regeneration of that electrolyte using steam. For example, as will be described in greater detail below, this invention reforms methanol and related fuels, particularly in liquid systems, using liquid alkaline electrolytes.

Oxidizable organic substances suitable for use in the present invention include saccharides, celluloses, starches, sugars, alcohols, ethers, carboxylic acids, aldehydes, ketones, biomass and biomass derived materials and mixtures of the foregoing. For example, suitable saccharides include monosaccharides, disaccharides, oligosaccharides, polysaccharides and mixtures thereof; suitable alcohols include $C_1$-$C_6$ alcohols and mixtures thereof, particularly methanol, ethanol and their mixtures; suitable ethers include dimethyl ether, methylethyl ether, diethyl ether and mixtures thereof. A particularly useful alcohol is methanol and a particularly useful ether is dimethyl ether.

Alkaline electrolytes suitable for use in the present invention include metal hydroxides, carbonates, bicarbonates and mixtures thereof. Furthermore, suitable metals of such electrolytes include alkali metals, alkaline earth metals and mixtures thereof. Particularly suitable metals of the alkaline electrolyte are selected from the group consisting of sodium, lithium, potassium, cesium, rubidium and mixtures thereof. Preferably, the electrolyte is present as an aqueous solution. Typically the electrolyte concentration, with reference to the reformer, is about 0.5 Normal (N) to about 12 N (within solubility limits for the compound being used); preferably about 1 N to about 8 N; more preferably about 2 N to about 6 N; for example about 2 N to about 4 N; such as about 3 N. Suitable concentrations of the electrolyte or mixed electrolytes present in the process as a consequence of regeneration may be less than the values expressed above, but will be within the ranges expressed in order for the process to operate efficiently. Fresh electrolyte may need to be provided in order to replace gradual losses of electrolyte, if any. In the absence of the physical loss of electrolyte components, the process of the present invention can be operated according to the disclosure provided herein, particularly allowing for selection of a convenient and suitable pH that can be achieved after regeneration. Thus, even if, after regeneration, the process approaches but does not return to the identical initial pH level selected at the start of the process, the process can nevertheless be operated so as to substantially approach the initial value and thereafter operate on a continuing basis at close to the initial value. Therefore, in the alternative, the pH level achieved following regeneration can identified and such a value can be selected as a convenient operation or target value.

The aqueous metal carbonate electrolyte composition suitable for use in the present invention optionally, but preferably, includes a metal bicarbonate as well. The molar ratio of metal carbonate to metal bicarbonate can be varied in order to prepare a useful aqueous alkaline electrolyte suitable for use in the present invention. Typically, the feeds to the reactor comprise one or more streams of an oxidizable organic substance or fuel and an aqueous electrolyte, wherein the latter has a high molar ratio of metal carbonate to metal bicarbonate. Useful ratios include molar ratios of about 1 to about 1000; preferably about 2 to about 100; more preferably about 3 to about 20. As the reforming reaction proceeds, the carbonate/bicarbonate ratio is reduced by the formation of reaction products, as discussed below. Consequently, the mixture in the regeneration step will have a lower ratio of carbonate/bicarbonate. Typically, the feed in the regeneration step can have a molar ratio of about 0.001 to about 5; preferably about 0.1 to about 3; most preferably about 0.6 to about 1. The pH of the electrolyte composition can be used as a convenient measure of the bicarbonate ratio. However, since the presence of methanol in the electrolyte can also affect the pH, the amount of methanol that is present can also be compensated for in order to arrive at an appropriate ratio in order to reach the target pH, or vice versa. For convenience herein, suitable electrolyte compositions of the present invention exhibiting a target pH and comprising a high concentration of a metal carbonate relative to bicarbonate, are referred to as carbonate-rich, even if such compositions comprise less than about 50 mol % metal carbonate. Alternatively, the pH of the reaction system can be used as a gauge to establish that the electrolyte is at a suitable concentration. Typically, the reforming reaction is conducted at a pH of about 7 to about 14; preferably about a pH about 8 to about 12; more preferably about 9 to about 11.5. As discussed further hereinbelow, other optional additives and salts can be included for purposes other than the reforming reaction, including corrosion control and efficient bicarbonate regeneration. Furthermore, the scope of the present invention includes optionally adding a minor amount of a caustic reagent to the electrolyte, such as sodium or potassium hydroxide, in order to achieve a specific pH level, particularly higher levels of pH. In such instances, it is expected that the amount of caustic will be quite small, for example, from greater than zero to less than about 10 wt % or less than 5 wt %, perhaps less than 3 wt % so that the overall process will remain economically attractive even though the caustic is not regenerated and a continuing addition would be required to maintain the pH.

Catalysts suitable for use in the present invention can be selected from the group consisting of compounds, complexes, alloys and mixtures thereof, comprising at least one metal selected from the Group VIII transition metals of the Periodic Table of the Elements (the Groups of elements as identified in the Periodic Table published in the CRC Handbook of Chemistry and Physics, 69$^{th}$ Ed., CRC Press, 1988). Suitable catalysts can further comprise at least one metal selected from the metals of Group IB, Group IIB, Group VIIB, and mixtures thereof. A particularly useful catalyst comprises platinum alone or further comprising a metal selected from the group consisting of copper, zinc and rhenium. Useful catalyst concentrations in the reactor, expressed in volume %, are typically about 0.1% to about 50%; preferably about 1% to about 40%; more preferably about 2% to about 20%. In a particularly useful embodiment, platinum is typically present at a wt % concentration of about 0.5% to about 40%; preferably about 1% to about 30%; more preferably about 5% to about 20%; for example about 10% to about 20%. In another useful embodiment, nickel is typically present at a wt % concentration of about 2% to about 100%; preferably about 25% to about 100%; more preferably about 40% to about 100%; for example about 60% to about 80%. In this regard, wt % refers to the amount of catalytically active metal present in the catalyst component. Thus, in the absence of a carrier, support or other inactive component, the catalyst is present at 100 wt %. Additionally, a useful form of the catalyst is where the catalyst is supported on or in a conductive or non-conductive material selected from the group consisting of metals, metal oxides, silica, alumina, silica-alumina, zirconia, titania, ceria, carbon, silicon carbide, silicon nitride, silicon boride and mixtures thereof. Furthermore, useful forms of supports include those selected from the group consisting of beads, powders, coatings on extruded substrates or monoliths and mixtures thereof.

The reforming reaction is typically conducted at a temperature of about 150° C. to about 350° C.; preferably about 200° C. to about 300° C.; more preferably about 200° C. to about 250° C.; for example, the reforming process is suitably conducted at about 200° C.

The reforming reaction is typically conducted such that the hydrogen is generated at elevated pressure. Typically the hydrogen pressure is about 1 atmosphere (atm) to about 1000 atm; preferably about 5 atm to about 500 atm; more preferably about 10 atm. to about 100 atm. However, it can be appreciated that useful pressures for operating the process of the present invention can be determined by one skilled in the art based on the use to which the hydrogen that is produced will be put. Thus, useful pressures can be any pressure including about 1 atm to about 1000 atm and all values and ranges therebetween.

Typically, alkaline electrolytes react with the $CO_2$ in reformate by-product to yield carbonates and bicarbonates. The preferred electrolytes are alkaline solutions of metal carbonate/bicarbonate salts. An example of the overall reaction is illustrated in equations (5) and (6) using methanol and alkaline potassium compounds:

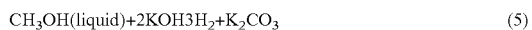

$$CH_3OH(liquid) + 2KOH \rightarrow 3H_2 + K_2CO_3 \quad (5)$$

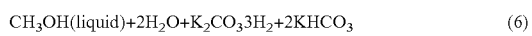

$$CH_3OH(liquid) + 2H_2O + K_2CO_3 \rightarrow 3H_2 + 2KHCO_3 \quad (6)$$

Reforming methanol in alkaline electrolytes increases the Free Energy driving force over conventional gas phase or liquid phase reforming as shown in FIG. 1. Heats of reaction were calculated using standard Free Energy, Enthalpy, and Entropy values as published in the CRC Handbook of Chemistry and Physics (previously identified). (It is understood that a negative value of Free Energy means that a reaction is thermodynamically favorable and a positive value of Free Energy is thermodynamically unfavorable.) Steam reforming of methanol is favorable at room temperature but the kinetics are sluggish. Methanol steam reforming is typically conducted at about 250° C. to about 350° C. The increased temperature increases both the thermodynamic driving force and the rate of reaction. FIG. 1 shows that the Free Energy driving force for methanol reforming in condensed water, in KOH (at pH 14) or in $K_2CO_3$ (at pH 12) is much more favorable than methanol steam reforming, even at much higher temperatures. Without wishing to be bound by theory, it is believed that this additional Free Energy advantage arises from an acid-base reaction between carbon dioxide, a weak acid, and KOH or $K_2CO_3$, strong bases. This supports the experimental finding that methanol reforming in aqueous and alkaline electrolytes can be run at lower temperatures than those typically needed for methanol steam reforming.

Based on heating values of the fuel and product, the theoretical conversion efficiency for methanol reforming under these conditions is greater than 100%. This is a significant advantage. Reacting water with methanol produces $3H_2$ molecules. Lower Heating Values (LHV) of methanol and $H_2$ are 638 kJ/mole and 242 kJ/mole, respectively. Comparing the heating value of fuel and product gives a theoretical conversion efficiency of 114%. The theoretical efficiency using Higher Heating Values (HHV) is 119%. HHV and LHV are defined in standard engineering and reference texts as follows: LHV is the energy liberated by the complete combustion of a substance where "the water produced is in the gas phase." In contrast, HHV is "the corresponding value when the water is in the liquid phase.... The difference between the two corresponds to the heat of vaporization of the water formed." (Smith et al., "Introduction to Chemical Engineering Thermodynamics," McGraw Hill, Second Ed., p. 143, 1959) The additional energy, resulting in efficiencies greater than 100%, arises from endothermic heat that is supplied to drive the reforming reaction. Methanol is not unique regarding reforming efficiencies of greater than 100%, the "theoretical" efficiency for methane steam reforming is even higher. However, the slow reaction kinetics for methane steam reforming requires supplying endothermic heat at temperatures above 600° C. In contrast, alkaline reforming according to the present invention can be conducted at temperatures as low as about 150° C. In this temperature range methanol and dimethyl ether are particularly preferred.

A significant advantage of the process of the present invention is that the product obtained is nearly pure hydrogen. In KOH, the gaseous carbon dioxide that is usually produced by steam reforming remains in the liquid as $K_2CO_3$ and in carbonates it remains as $KHCO_3$. Thus the chemical activity of the by-product carbon dioxide approaches zero, so that any carbon monoxide production, via the reverse water gas shift reaction (3), is greatly suppressed. Sequestration of the carbon dioxide greatly simplifies the product clean up. In contrast, carbon dioxide cleanup is a major expense in conventional steam reforming of natural gas. In methane steam reforming processes, carbon monoxide and carbon dioxide cleanup often requires a two-stage water gas shift reactor followed by a pressure swing adsorption unit, adding to cost and increasing energy consumption.

Another advantage of present invention is that a pressurized hydrogen product can be generated without the need for gas phase compressors. The reactor operating pressure is often dictated by the application to which the product hydrogen will be put. Various applications can require anywhere from near-atmospheric pressure hydrogen to hydrogen at several hundred atmospheres or more. To operate above ambient pressures, liquid feeds are pressurized up to reactor operating pressure and then hydrogen is evolved at the pressure of the reactor. In most applications, it is much less expensive and more efficient to pressurize liquid feeds than to use compressors to increase the pressure of the hydrogen produced.

Figure 2:
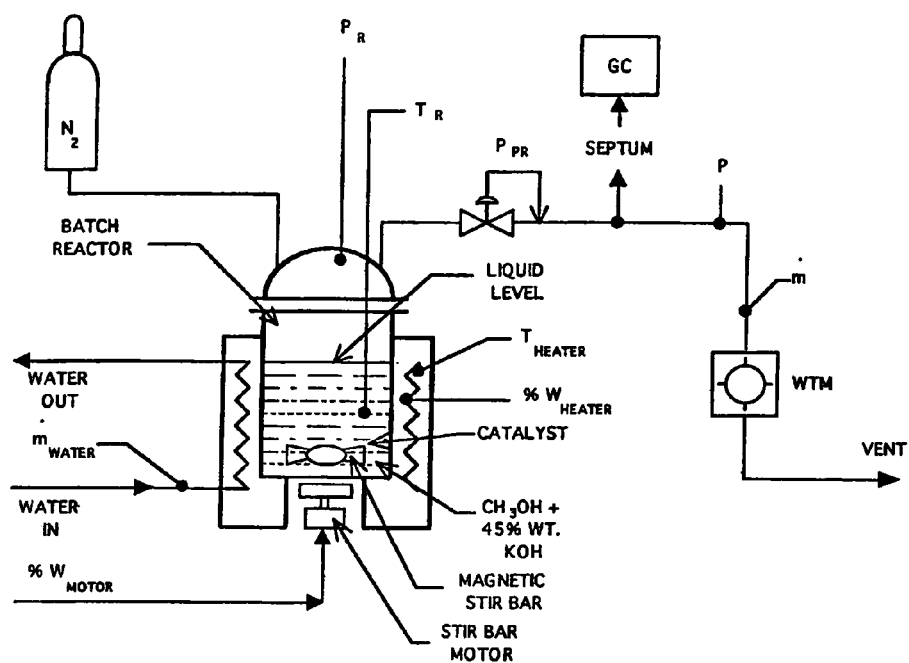
FIG. 2 shows a schematic of a batch reactor test station used for liquid phase reforming catalyst evaluations.

FIG. 2 shows a schematic of a batch reactor for conducting liquid-phase reforming. The reactor is a pressure vessel which is initially charged with a mixture of an aqueous liquid electrolyte, an oxidizable fuel, such as methanol, and, typically, a catalyst. The pressure vessel is then sealed and heated to the reaction temperature. Hydrogen (and carbon dioxide when pH<7) is evolved as the reaction proceeds, as described in reactions (5) and/or (6), and the pressure gradually increases. Catalyst activity, for example, can be evaluated as a function of pressure versus time (as well as other process variables amenable to a batch experiment). Eventually one reactant becomes exhausted, the reaction slows to a halt and the pressure approaches a constant value. In typical batch operations, even those on a commercial scale, all reactants must be charged at the beginning of the process and at the end of the reaction, the product and spent reactants must be removed. During such start-up and shutdown periods, no product is being produced and, consequently, such processes are not efficient, particularly compared to continuous processes.

It is often preferable to conduct chemical processes in a continuous rather than a batch processing mode and a continuous process is a preferred embodiment of the present invention. Typical advantages for continuous operation include greater productivity and easier process control. For example, batch processes can include frequent start-up and shutdown conditions, and during these periods, the product produced may not meet specifications or product may not be produced at all. In addition, in a batch reactor, the reaction mixture is constantly changing so that process control is complicated requiring the need to monitor conditions that necessarily change with time. In contrast, a continuous process is productive essentially 100% of the time, or at least until a decision is made to terminate the reaction or an unforeseen complication arises. Consequently, less off-specification product is produced. In addition, process control variables in a continuous process typically do not change with time, so that process control can be based on fixed rather than changing control points. Since virtually all large-scale hydrogen applications, such as the petrochemical and fertilizer industries, require a continuous feed of high-purity hydrogen, similarly such operations can benefit greatly from a process that includes continuous regeneration of a critical reaction component, the electrolyte. In other words, if liquid phase reforming for the production of hydrogen is to find its place in large-scale industrial processes, then the improvements of the present invention are an important aspect of that advance. Unlike the processes of the prior art that are typically conducted in batch operations, the present invention allows for continuous operation and production of hydrogen with simultaneous regeneration of the electrolyte in an efficient and cost-effective process.

Figure 3:
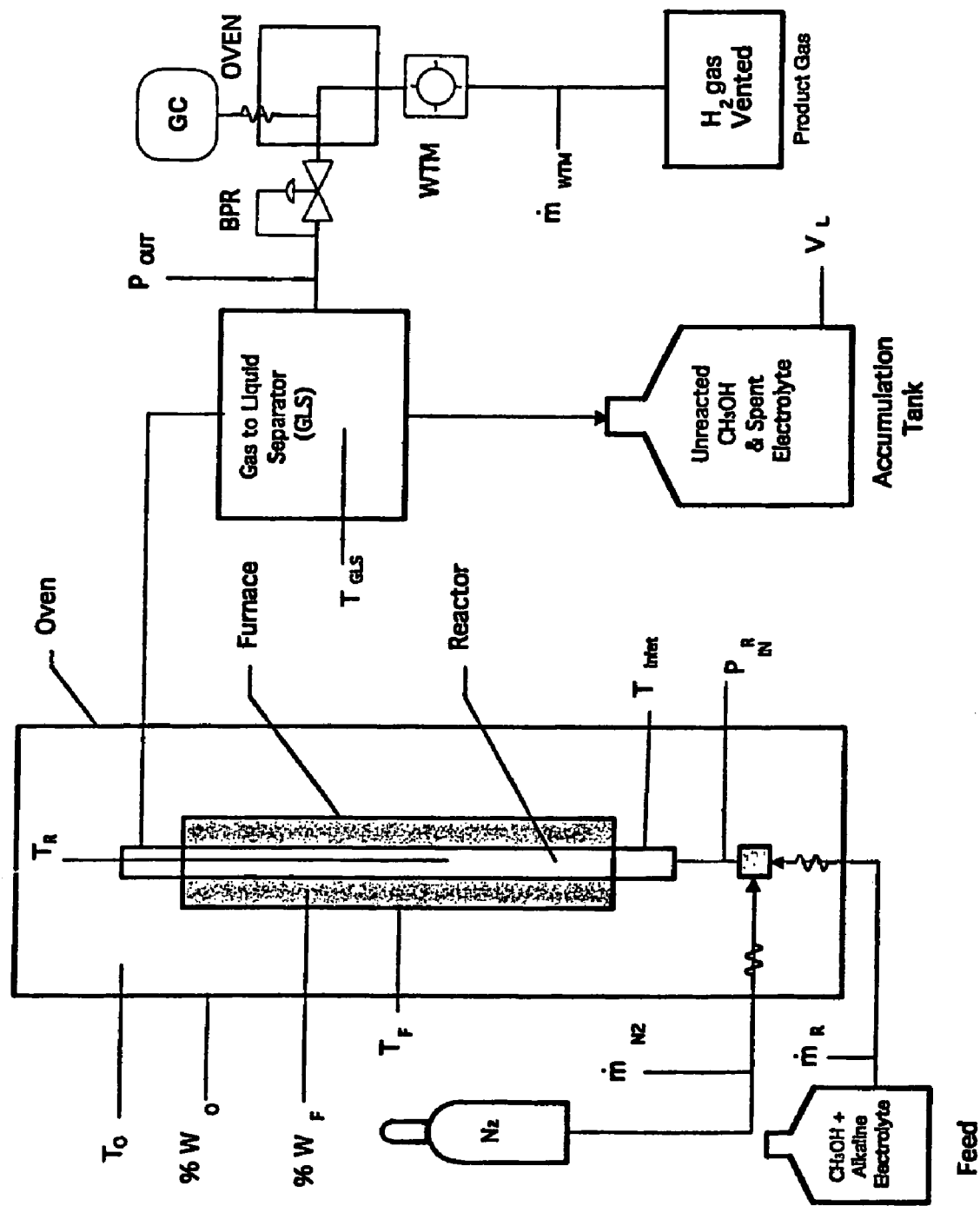
FIG. 3 shows a schematic of a continuous reactor used for liquid phase reforming catalyst evaluations.

FIG. 3 is a schematic illustration of an experimental, continuous reactor for conducting liquid phase reforming. In this arrangement, the reactor is filled with a catalyst. It is continuously fed with a mixture of an electrolyte and an oxidizable reactant or fuel, such as methanol. Hydrogen is continuously evolved as the reactants pass through the reactor bed. Typically the reactor is sized so that the reactions shown in equations (5) and/or (6) reach a high level of fuel conversion. Conversion is typically about 20% to about 100%; preferably about 75% to about 100%; more preferably about 95% to about 100%; most preferably about 98% to 100% conversion. In such a continuous process, start-up and shutdown times are minimized and, as a result, the product hydrogen can be produced at a constant rate almost 100% of the time. In the integrated, continuous process of the present invention including regeneration, a regeneration unit or section, including various configurations as further described herein below, can be included after the "accumulation tank" in FIG. 3. Liquid from the accumulation tank, comprising spent electrolyte, water and unreacted fuel, for example, methanol is fed to a regenerator. Steam is fed to the regenerator and by-product carbon dioxide leaves the regenerator as well as a liquid stream comprising the regenerated electrolyte, which is returned to the reformer section of the process, for example, the feed tank as illustrated in FIG. 3. A continuous, integrated process is not limited to such an arrangement of elements, as other configurations will be apparent to those skilled in the art in view of the teachings and disclosures herein.

It is known to remove carbon dioxide from methane synthesis gas by using hot carbonate, promoted hot carbonate or similar processes utilizing amines. For purposes of the present invention, the phrase hot carbonate refers to an aqueous composition comprising alkali carbonate and bicarbonate salts at temperatures above ambient (ambient typically considered to be about 20° C. to about 25° C.). Many compounds have been used to increase the rate of carbon dioxide absorption and desorption in hot carbonate processes, such compounds sometimes referred to herein as promoting agents. When a promoting agent is employed in the present invention, at least one compound can be added to at least one of the reaction mixture, the absorption step, the regeneration step or a combination thereof. At least one compound can be selected from the group consisting of various amines, such as methyl ethyl amine, alcohol amines, hindered amines, as well as borates, arsenates, glycines, piperazine and mixtures thereof. In the present invention, one or more of such promoting agents can be used to positively affect or promote the absorption reaction, the regeneration reaction or both. Promoters are typically added in concentrations of about 0.1 to about 3 molar; preferably about 0.5 to about 1 molar. The use of a promoter ordinarily does not significantly affect the amount of carbon dioxide that can be adsorbed in the hot carbonate electrolyte, but a promoter increases the rate of absorption of carbon dioxide as well as the rate of regeneration of the hot carbonate electrolyte. Promoters can be useful because they can facilitate processing of the same amount of carbon dioxide in smaller processing vessels, thereby reducing capital cost of the processing unit. A typical hot carbonate process integrated with a methane steam reforming/water gas shift process is comprised of two towers. The first or absorber tower is located downstream of a water gas shift reactor. An aqueous solution of $Na_2CO_3$ enters the top of the absorber. Carbon dioxide from the shifted synthesis gas reacts with the carbonate and water to form dissolved bicarbonates via reaction (7).

$$CO_2 + K_2CO_3 + H_2O \rightarrow 2KHCO_3 \tag{7}$$

A stream containing synthesis gas and the dissolved bicarbonates exits from the top of the absorber substantially reduced in carbon dioxide. This bicarbonate-rich solution is sent to the top of the second tower, the regenerator. Pressure is typically reduced prior to entering the regenerator in this as well as the other, alternative process arrangements of the present invention described herein. For example, whatever operating pressure is selected for the production of hydrogen, the pressure in the regenerator is typically reduced to about 0.3 atm to about 2 atm; preferably to about 0.5 atm to about 1.5 atm; for example about ambient pressure. A combination of thermodynamics and economics provides that hot carbonate processes should be regenerated near or below atmospheric pressure in order to reduce stream consumption. Furthermore, the partial pressure of carbon dioxide in the absorber liquid product is used to drive the gas out of solution via the reverse of reaction (7). If the regenerator pressure is reduced below the absorber product partial pressure, large amounts of carbon dioxide tend to flash out of solution, simplifying and reducing the work-load on the regenerator. Steam is introduced at the bottom of the regenerator and acts to reverse reaction (7); this reaction is illustrated using the potassium salt, but any suitable alkali metal or alkaline earth metal carbonate, or mixture, can be used, for example, sodium carbonate. A sodium or potassium carbonate-rich stream leaves the bottom of the regenerator and is recycled back to the stripper. Carbon dioxide and steam exit from the top of the regenerator. There are several variations of this process including the use of solutions that can be promoted or unpromoted. Hot carbonate and promoted hot carbonate processes are described by Danckwerts et al., "The Absorption of Carbon Dioxide Into Solutions Of Alkalis and Amines", The Chemical Engineer, pp. 244-280, (1966); Kohl et al., "Alkaline Salt Solution for Hydrogen Sulfide and Carbon Dioxide Absorption" in Gas Purification $3^{rd}$ Edition, Gulf Publishing Company Houston, Tex., 1979, 158-221; and Pierantozzi, "Carbon Dioxide", Kirk-Othmer Encyclopedia of Chemical Technology, $4^{th}$ Ed. 1993, vol. 5, 42-53, each incorporated herein by reference.

Other useful hot carbonate processes include various heat recuperation and thermal integration schemes or staging based on process particulars. For example, in one embodiment the regenerator can be run at a lower (or higher) temperature than the absorber. In such embodiment(s) the liquid effluents from each tower are run into a recuperative heat exchanger which pre-heats the liquid feed to the absorber and cools the liquid feed to the regenerator. An example of recuperative heat exchangers is illustrated in Perry's Chemical Engineers Handbook, $4^{th}$ edition, McGraw Hill, FIG. 14-19, p. 14-31, 1963. In alternate embodiments the absorber and regenerator towers can be staged so that liquid product from an upper absorber will be cycled to an upper regenerator and the liquid product from a lower absorber(s) will be cycled to a lower regenerator. Staging alternatives are also described in the above-noted reference by Kohl et al.

The regeneration step, preferably comprising the hot carbonate regeneration method described herein, can be conducted at suitable temperatures as described herein. Useful temperatures typically are about 85° C. to about 200° C.; alternatively, about 100° C. to about 190° C.; such as about 110° C. to about 180° C.; for example, about 130° C. to about 175° C.; or about 150° C. to about 170° C. In those instances where the temperature exceeds about 100° C., the regeneration step is necessarily conducted in a pressurized vessel or environment such that a liquid-phase process can be continued. In preferred embodiments, regeneration is conducted at temperatures of about 85° C. to about 100° C.; or about 90° C. to about 100° C.; alternatively, greater than about 100° C. and less than about 200° C.

There are various alternative embodiments of the present invention that usefully integrate the liquid phase, electrochemical reforming (ECR) process with hot carbonate regeneration processes for the production of hydrogen from a fuel such as methanol.

Figure 4:
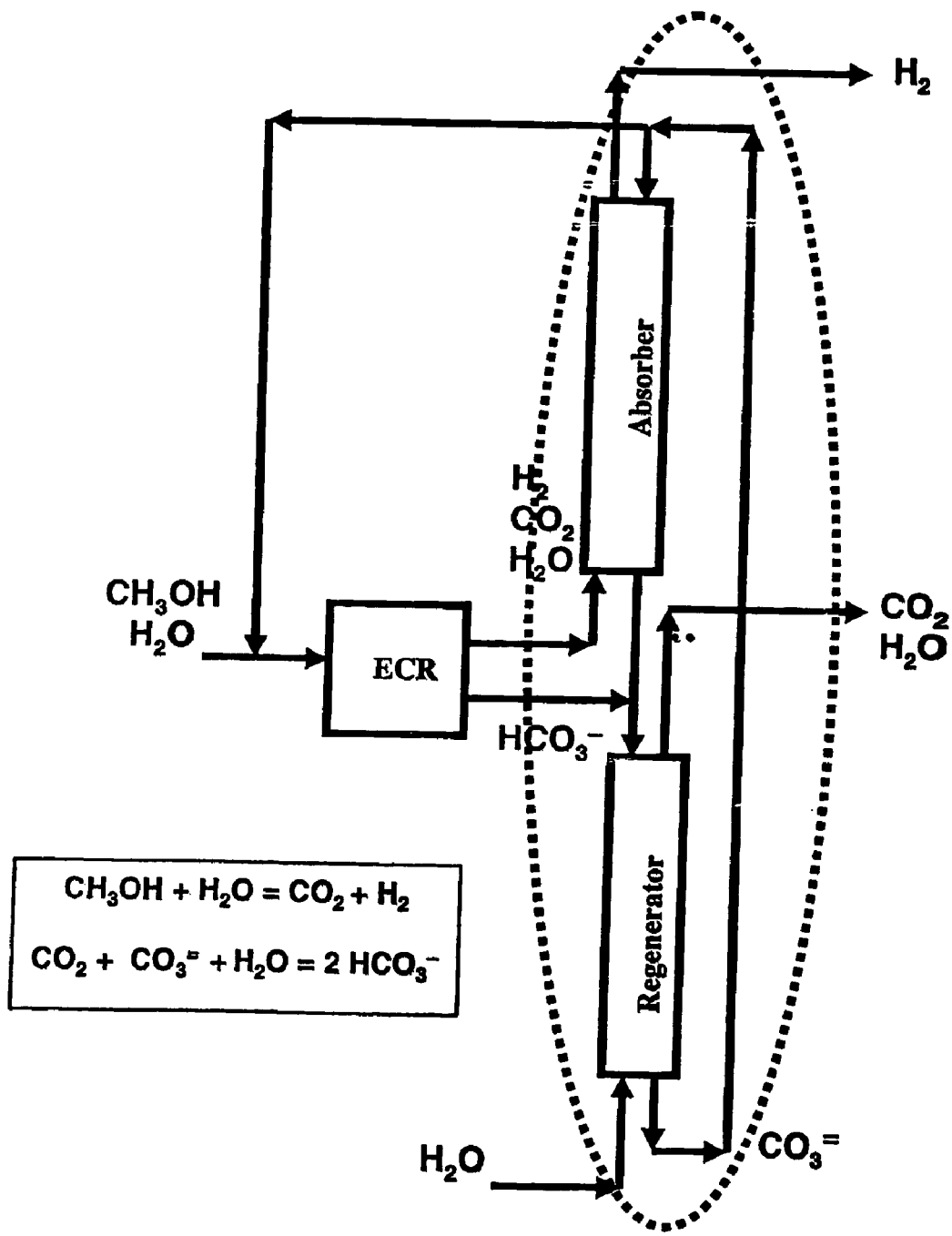
FIG. 4 shows a schematic of a liquid phase reformer integrated with a hot carbonate process for removing carbon dioxide from product hydrogen and for regenerating spent reformer electrolyte.

FIG. 4 is a schematic representation of a process wherein a carbonate-rich solution from the regenerator flows co-currently with the product hydrogen along a reactor, for example a plug flow ECR reactor. For purposes of the present invention, plug flow is defined as follows:

In an ideal plug flow reactor or vessel every fluid element entering the vessel follows the element that entered before it without any intermixing and exits the reactor in exactly the same order. At any instant then, the exit stream is made up of fluid elements, all of which have been resident in the reactor for exactly the same length of time. Stated another way, idealized plug flow is a simple way of modeling flow of a fluid in, for example, a pipe, reactor or any vessel in general, wherein the structure of the vessel or the conditions of flow (or both) are such that "plugs" or finite volumetric elements of fluid pass through the vessel with substantially no back mixing between the elements or plugs. Under practical operating conditions, an efficient plug flow reactor can substantially approach the above definition of an ideal plug flow vessel or reactor, but it is expected that, in typical operation of the present invention, at least some hydrogen gas product will bypass the liquid feed and some back-mixing can occur.

For reference purposes the hot carbonate process is encircled in the figure. Most of the carbon dioxide produced during the hydrogen forming reaction is absorbed into the electrolyte to form the corresponding metal bicarbonate. Typically about 50% to about 99% or more of the carbon dioxide is removed; preferably about 70% to about 95% or more; for example, about 90% to about 99%. If any gaseous carbon dioxide leaves with the product hydrogen, it can be substantially removed by sending the product into the absorber. Typically, the absorber operates to remove about 50% to about 99% or more of the carbon dioxide that may be present; preferably about 90% to about 99% or more; more preferably about 95% to about 99% or more. The bicarbonate-rich streams from the reactor and the absorber are combined and sent to the regenerator. Again, steam is used to reverse reaction (7) and to substantially regenerate the carbonate-rich stream. The carbonate-rich stream is then split to feed both the ECR reactor and the absorber. Typically about 50 to about 99% or more of the regenerated carbonate-rich stream is sent as feed to the reactor; preferably, about 90% to about 99% or more of the regenerated carbonate-rich stream. Substantially all of the carbon dioxide formed in the process leaves the process with steam from the top of the regenerator.

The process scheme illustrated in FIG. 4 is an improvement over sequentially integrating an ECR reformer, typically including catalyst, with a hot carbonate process because the reforming reactions occur in the liquid phase and most (for example, greater than 80%) of the carbon dioxide is converted directly to bicarbonate. As a result, the absorber in FIG. 4 is much smaller because it can be sized to remove less than about 20% of the carbon dioxide from the gaseous hydrogen product stream rather than about 100%.

Figure 5:
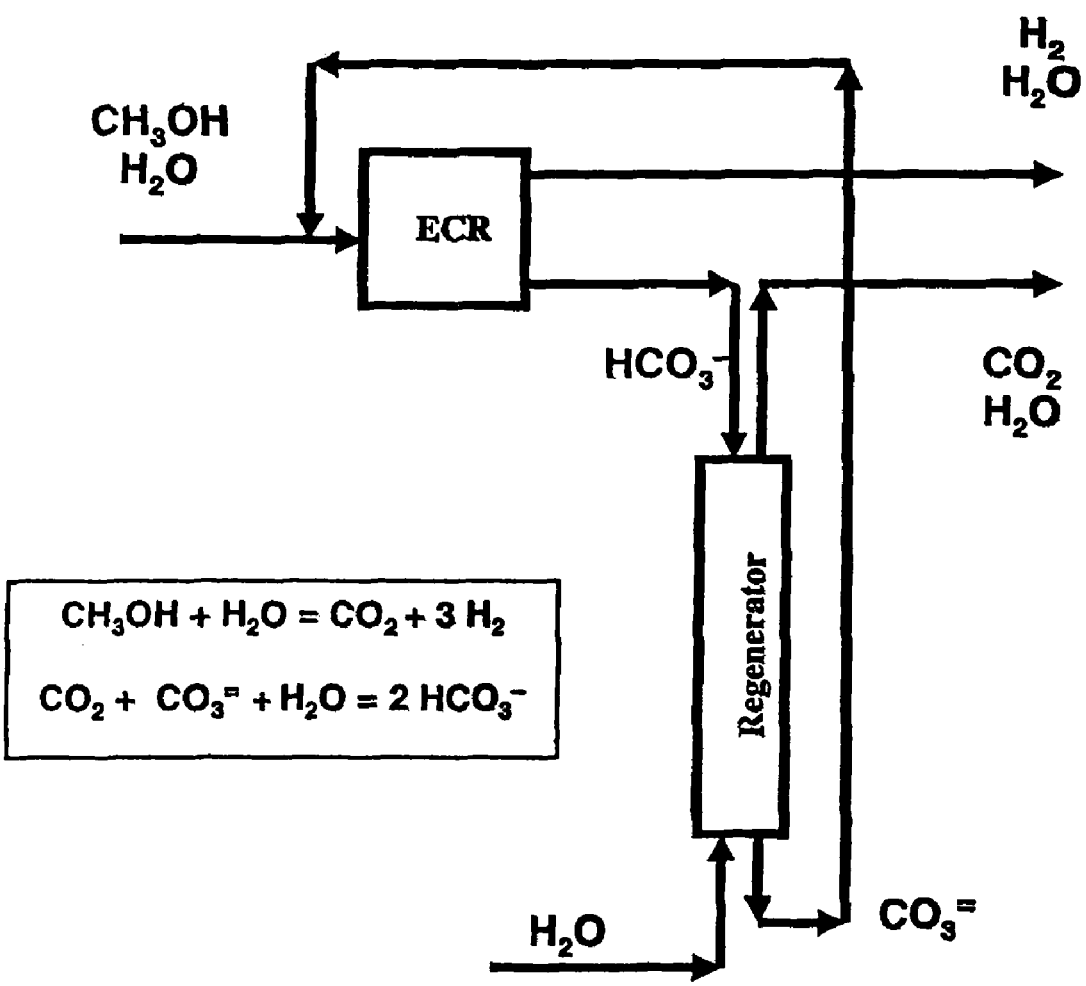
FIG. 5 shows a schematic of a liquid phase reformer in close-coupled co-current integration with a hot carbonate process for removing carbon dioxide from product hydrogen and for regenerating spent reformer electrolyte.

The process embodiment of the present invention illustrated in FIG. 4 can be further simplified. Substantially all carbon dioxide from a plug flow (or non-plug flow) ECR reactor can be captured as bicarbonate. For example, typically, about 90% to about 99% or more of the carbon dioxide that may be present is removed; preferably about 95% to about 99% or more; more preferably about 98% to about 99% or more; for example about 99%. In this embodiment, the absorber tower can be eliminated as shown in FIG. 5. Again, a carbonate-rich solution is mixed with a fuel, e.g., methanol, feed and flows co-currently along a plug flow ECR reactor, also typically containing catalyst. In this embodiment, substantially all of the carbon dioxide leaves the reactor in the bicarbonate-rich stream. A substantially carbon dioxide-free hydrogen product is produced as noted above. The bicarbonate-rich stream is again sent to the regenerator where steam is used to regenerate the carbonate-rich stream. Substantially all of the carbonate-rich stream is re-circulated as a feed to the ECR reactor. This preferred embodiment is a simplification of the process illustrated in FIG. 4 because a separate absorption tower is totally eliminated.

A further improvement over the embodiments illustrated in FIGS. 4 and 5 is shown in FIG. 6. The process again uses two towers. In contrast to FIG. 4, the first tower is loaded with catalyst so that the tower or reactor acts as both the ECR reactor and absorber. As described hereinabove, a suitable catalyst is selected from one or more of those useful in the reforming reaction. The second tower continues to act as a regenerator. In this embodiment, a feed of water and methanol enters at a feed plate at an intermediate point along the first tower. The specific feed location depends on such factors as the operating temperature of the reactor and on the particular catalyst employed. However, typically the feed will enter the tower in the middle third of the tower; alternatively, in the top third quarter or in the bottom second quarter; for example, about midway in the tower. The product hydrogen and the absorption carbonate solution run counter-current to each other. The down flowing carbonate-rich stream acts to capture and remove carbon dioxide as a bicarbonate. If any methanol vapors or carbon dioxide are carried up the column with the gaseous hydrogen product, the incoming carbonate stream absorbs them from the gas and pulls them downward in the liquid phase. The section of the first tower below the feed ensures that substantially all of the methanol is reacted before the bicarbonate-rich stream exits the first tower. This bicarbonate-rich stream is again preferably reduced in pressure and sent to the regenerator tower where it is purged or reacted with steam in order to remove substantially all of the carbon dioxide and to regenerate the carbonate-rich stream. Stream flow rates and sizing will depend on the scale of the reformer and such quantities are readily determinable by an engineer using standard engineering knowledge.

The countercurrent flow of product hydrogen versus the regenerated electrolyte flow in FIG. 6 is superior to the co-current integrations as shown in FIG. 4 and FIG. 5 because countercurrent flow enables a more complete separation of the carbon dioxide and methanol from the product hydrogen and a more complete reaction of methanol or other volatile fuel. The down flowing electrolyte acts to absorb gas phase methanol and/or carbon dioxide from the hydrogen product, thereby reducing the impurity levels of these components in the product by as much as about 20 times over the co-current integrations. Furthermore, conversion of the fuel is higher because substantially all of, for example, the methanol is contained in the reactor column, thereby providing for increased conversion as a result of a longer residence time. While actual improvements are typically dependent on the design specifics, countercurrent flow has the potential to increase the residence time of the oxidizable fuel (e.g., methanol) by 2 to 3 times over a similarly sized co-current process. Under such circumstances, if the residence time of a first order reaction is increased by a factor of 2 to 3 fold, a 90% conversion in a co-current design could be increased to 99% and 99.9% respectively. Even an improvement of 1.5 to 2 fold can be significant. For example, an improvement of 1.5 fold can increase conversion from 90% to 97%, with the associated significant economic benefit.

A significant economic advantage of the present invention in its various embodiments is that hydrogen can be produced without the need to continuously add fresh caustic reagents (hydroxides, carbonates and or their mixtures) using instead an effective and economical electrolyte regeneration method. Also, liquid phase reforming in alkaline electrolytes produces a relatively pure hydrogen product that is significantly lower in carbon monoxide and carbon dioxide than typical steam reformed hydrogen products. Furthermore, the hydrogen can be produced at pressures exceeding 1000 psi so that expensive compressors are not needed downstream of the reformer to obtain a high pressure product.

The following examples are provided as specific illustrations of embodiments of the claimed invention. It should be understood, however, that the invention is not limited to the specific details set forth in the examples. All parts and percentages in the examples, as well as in the specification, are by weight unless otherwise specified. Furthermore, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements or methods steps.

As used throughout the specification, including the described embodiments, the singular forms "a," an," and "the" include plural referents unless the context clearly dictates otherwise. Thus, for example, reference to "an oxidizable fuel" includes a single fuel as well a two or more different fuels in combination, reference to "a metal carbonate" includes mixtures of two or more metal carbonates as well as a single metal carbonate, and the like.

The term "about" encompasses greater and lesser values than those specifically recited provided that the value of the relevant property or condition facilitates reasonably meeting the technologic objective(s) of the present invention as described in detail in the specification and claims. More specifically, the term "about" when used as a modifier for, or in conjunction with, a variable, is intended to convey that the numbers and ranges disclosed herein are flexible and that practice of the present invention by those skilled in the art using, for example, concentrations, amounts, contents, carbon numbers, temperatures, pressures, properties such as density, purity, etc., that are outside of a stated range or different from a single value, will achieve the desired result, namely, the efficient production of hydrogen including regeneration of an alkaline reactant.

EXAMPLES

Example 1

Catalysts for liquid phase reforming in caustic electrolytes were experimentally evaluated in a test stand shown schematically in FIG. 2. Mixtures of methanol, aqueous caustic electrolytes and catalysts were initially charged into a reaction vessel and then sealed. The vessel was then heated to reaction temperatures between 150° C.-250° C. Kinetics were measured as a pressure build-up caused by evolved hydrogen. Gas chromatography (GC) analysis of the product gases using potassium hydroxide typically showed high purity hydrogen with only trace amounts (less than 1000 ppm) of carbon monoxide, carbon dioxide or methane. A wet test meter (WTM) was used to monitor the amount of hydrogen gas evolved.

A series of conductive metallic catalysts were evaluated using the test stand shown schematically in FIG. 2. FIG. 7 compares the activity from these catalyst evaluations. The results are presented as hydrogen pressure increase after the reactor was heated to a steady state temperature of 200° C. All tests utilized substantially the same charge, 40 ml methanol and 250 ml 45 wt % KOH, so that the pressure curves are directly comparable as a function of catalyst loading and catalyst type. The catalysts tested are identified in the legend accompanying FIG. 7. Although KOH electrolyte was used in these tests, it is expected that comparable results will be observed using an electrolyte composition comprising carbonate, as disclosed herein.

These experiments demonstrated that platinum catalysts exhibited the highest activity. Even so, there was considerable overlap in activity between the lowest platinum containing catalysts and the highest nickel containing catalysts. Since platinum is about 1000 times more expensive than nickel, a nickel catalyst can be more cost-effective in a particular process embodiment. Amongst both of the catalyst groups or samples including platinum or nickel, the higher catalyst surface area generally correlated with higher activity. However, higher activity per unit surface area was generally observed with low surface area particles. This observation is generally consistent with the understanding that an internal diffusion, mass transfer limitation within the catalyst particles can affect catalyst performance. This suggests that high surface area catalysts are most active when using small particle size catalysts and may also suggest that a nickel slurry catalyst as the most cost-effective. On the other hand, an experiment using Raney nickel exhibited an exceptionally high activity per unit surface area. In one of the experiments represented by curve 3 in FIG. 7, the amount of oxidizable reactant (methanol) relative to platinum catalyst, was significantly decreased in order to demonstrate that in the reforming reaction the reactant can be substantially completely reformed. Complete reformation was achieved in this experiment, but since the amount of methanol present was less than in the other experiments, the total amount of hydrogen produced (and consequently its pressure) was less, resulting in the distinctly different pressure curve.

Example 2

A series of experiments are described which illustrate significant features or steps of the invention. These steps are common to the process integrations described in the application, particularly in FIGS. 4, 5 and 6. These tests were conducted in the form of batch experiments for demonstration purposes. Furthermore, in view of the comprehensive teachings provided herein, they can be integrated to form a continuous, multi-step process.

The steps are described as follows:

Step A: Generation of hydrogen from a fuel, in this instance methanol was used, in a liquid composition at a pH between 10.5 and $\leq 12$, producing a bicarbonate-rich electrolyte, in other words a solution in which the reforming reaction proceeds via an electrochemical pathway, an ion-conducting electrolyte, thereby lowering its pH to a range between 8 and 10.5. In this step, a substantial portion, but not all of the carbonate is converted to bicarbonate;

Step B: Using steam to substantially regenerate the bicarbonate-rich electrolyte to a carbonate-rich electrolyte thereby increasing the ratio of carbonate to bicarbonate to approach the original ratio and increasing the electrolyte pH to approach the starting pH in Step A;

Step C: Using the regenerated electrolyte to produce additional hydrogen from the fuel, e.g., methanol.

Experiment

Step A: Making $H_2$ from fuel (methanol) at $pH \leq 12$

The batch reactor, schematically shown in FIG. 2, was charged with an aqueous solution of potassium carbonate and potassium bicarbonate, as shown in Table 2 (starting pH=11.6), containing methanol and a reforming catalyst (20 wt % Pt supported on carbon) provided by E-Tek, Inc., (Somerset, N.J.). The reactor was run at 200° C. using pressure to follow the reaction progress. Reaction (6) generates hydrogen and converts carbonates to bicarbonates. In the process, the pH is gradually lowered as the level of bicarbonate increases.

Figure 8:
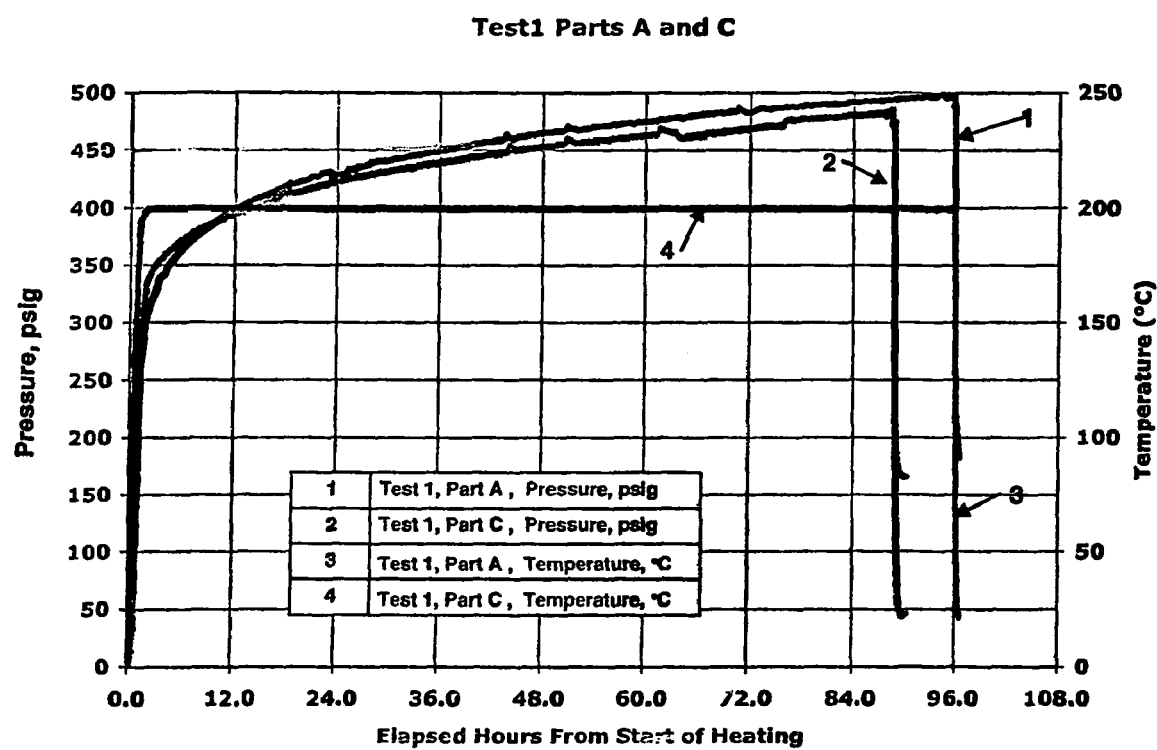
FIG. 8 compares hydrogen generation in fresh and regenerated carbonate electrolytes using a Pt/C catalyst.

Reactor pressure at the start of the 200° C. hold was 300 psi. The reaction progressed for about 95 hours. At the end of this period the pressure had increased to 495 psi. At the end of this period, the reaction rate had declined to a negligible rate even though 70% of the methanol and 70% of the carbonate from the original reaction charge still remained in the reactor. The final pH was 10. A pressure versus time record for this experiment is plotted in FIG. 8. Table 2 summarizes the initial and final compositions (based on calculated pressure changes in the batch reactor), pH as measured with and without methanol and the initial and final reaction rates. (The presence of methanol has a small effect on pH.) Carbonate composition was also measured via titration before and after the experiment. Gas chromatograms documented hydrogen and carbon dioxide content in the reaction product at various points during Step A. The electrolyte was not separated from the catalyst, but instead the whole mixture was saved for Step B, except for small samples taken for titration.

Step B: Regenerate electrolyte back toward original pH

Spent electrolyte from Step A was placed into a flask and heated to generate steam. Vapors from the flask were refluxed using a condenser coil. The steam effected a reversal of reaction (7) and eventually stripped most of the carbon dioxide that had been trapped in the electrolyte during Step A. Carbon dioxide vapor was allowed to escape from the condenser and its volume was measured using a wet test meter.

Boiling continued over 14 hours until the carbon dioxide evolution rate had dropped substantially, thus indicating that regeneration had approached completion. During this refluxing the condenser returned substantially all of the water and methanol to the boiling flask. Comparison of the pressure buildup during Step A with the carbon dioxide measured by the wet test meter showed that about 100% of the bicarbonate created in Step A was removed in Step B. At the end of this period the condenser was removed and boiling continued for another 1.5 hours in order to remove substantially all of the unreacted methanol. The pH measured after this step was 11.7. Some water was lost as water vapor during this distillation. Electrolyte carbonate composition was again measured via titration after the steam stripping. The regenerated electrolyte was saved for Step C. Table 2 summarizes the total carbon dioxide evolved, the initial and final electrolyte compositions (based on calculated pressure changes in the batch reactor and carbon dioxide evolution in the Step B, and pH as measured with methanol.

Step C: Using regenerated electrolyte to make $H_2$ from methanol.

The batch reactor was re-charged with the regenerated electrolyte from Step B. Fresh water and methanol were added to replace that removed by reaction in Step A and by distillation in the final stages of Step B. A small increment of catalyst was also added to make up estimated losses from transfers and titrations that occurred in Steps A and B. The reactor was again run at 200° C. using pressure build-up to follow the reaction progress. After addition of the makeup water, the electrolyte pH dropped to 11.2 prior to methanol addition and increased to 11.4 after methanol addition. The pH of the initial mixture charged for Step A was 11.6. This close approach to the original pH in Step A is further evidence that Step B converted substantially all of the bicarbonate formed during Step A back to carbonate.

Reactor pressure at the start of the 200° C. hold was 340 psi. This pressure is slightly higher than that in Step A (+40 psi). In highly concentrated alkali carbonates, methanol is known to form a second methanol-rich phase. The presence of a methanol-rich phase exhibits a higher methanol vapor than when methanol is fully dissolved in the aqueous carbonate phase. Alternatively, the additional pressure could suggest that regeneration of the original carbonate charge in Step A was slightly less than 100%, causing a small incremental increase in carbon dioxide partial pressure. The reaction progressed for about 90 hours. At the end of this period pressure had increased to 480 psi. Also at the end of this period, the hydrogen generation rate had declined to a negligible rate compared to the original, even though 69% methanol and 69% of the carbonate in its starting reaction charge remained in the reactor. Final pH was 10.6. The pressure versus time record for Step C is also plotted in FIG. 8 for comparison with Step A. The improved initial rate in Step C is consistent with Step A and the interpretation that the electrolyte approached full regeneration in Step B. Table 2 summarizes the initial and final compositions (based on calculated pressure changes in the batch reactor), and pH (as measured with and without methanol). Carbonate composition was also measured via titration before and after Step C. GC data again documented hydrogen and carbon dioxide content in the reaction product at various points during Step C.

amount of catalyst was increased from 3 g to 104 g. In spite of its slower kinetics, nickel is about 1000 times less expensive than platinum per unit weight and thus nickel may be a more cost-effective catalyst. In Step A the pH decreased from 10.95 to 10.54. In Step B, the electrolyte (which contained a nickel slurry and was difficult to separate by decantation), was steam stripped until the final pH increased from 10.54 to 11.14. In Step C, the regenerated electrolyte was again recharged with fresh methanol. The hydrogen generation returned to the initial rate observed in Step A, again suggesting that regeneration of the electrolyte in Step B was substantially 100%. The amounts of hydrogen produced in Step A, the carbon dioxide observed in Step B and the titrations were more consistent in Example 2 than they were in Example 3, possibly due to experimental error.

Alternative embodiments of the invention are set forth in the following numbered paragraphs:

A process for producing hydrogen gas comprising contacting in the liquid phase at least one oxidizable organic substance in the presence of a conductive catalyst and an alkaline electrolyte, wherein:

(A) hydrogen gas is generated in a reactor having a top and bottom, wherein said at least one oxidizable organic substance is introduced into said reactor at a point substantially midway between said top and bottom;

(B) an alkaline electrolyte comprising at least one metal carbonate is introduced into said reactor at a point substantially at the top of said reactor such that said metal carbonate and said hydrogen gas flow substantially countercurrent to one another, thereby resulting in the production of at least one metal bicarbonate composition;

(C) said at least one metal bicarbonate composition is regenerated and said at least one oxidizable organic substance comprises an oxygenated hydrocarbon.

The process of paragraph 85 wherein a process stream comprising said metal bicarbonate is reduced in pressure compared to the pressure in said reactor and introduced into a second reactor where it is contacted with steam, thereby producing carbon dioxide and substantially regenerating said alkaline electrolyte.

The process of paragraph 85 wherein said regenerated alkaline electrolyte is introduced into said hydrogen generating reactor.

TABLE 2

Summary of Electrolyte Regeneration Using Pt/C Catalyst

| Variable* | Begin Expt. 1 Step A | End Expt. 1 Step A | Begin Expt. 1 Step B | End Expt. 1 Step B | Methanol Distillation | Begin Expt. 1 Step C | End Expt. 1 Step C |
|---|---|---|---|---|---|---|---|
| $K_2CO_3$ | 0.4995 | 0.3496 | 0.344 | 0.4912 | 0.4809 | 0.4679 | 0.3247 |
| $KHCO_3$ | 0.0512 | 0.351 | — | 0.0511 | 0.05 | 0.0486 | 0.3349 |
| $CH_3OH$ | 0.518 | 0.368 | 0.363 | 0.356 | 0 | 0.469 | 0.326 |
| $H_2O$ | 12.03 | 11.73 | 11.54 | 11.69 | 9.614 | 11.35 | 11.07 |
| Catalyst (gm) | 3.01 | 3.01 | 2.96 | 2.96 | 2.96 | 2.96 | 2.96 |
| Volume (mL) | 250 | 245 | 241 | 237 | 185 | 235 | 230 |
| pH, no $CH_3OH$ | 11.45 | na | na | na | na | 11.22 | na |
| pH + $CH_3OH$ | 11.63 | 10.06 | 10.06 | 11.17 | na | 11.43 | 10.6‡ |
| $CO_2$ Evolution | — | — | — | 0.1533 | — | — | — |
| Total $H_2$ Evolved | — | 0.4498 | — | — | — | — | 0.4294 |

*Chemical components in moles except as indicated
‡Measured at 21.3° C.

Example 3

The series of experiments described in Example 2 were repeated using a Ni catalyst (spherical nickel powder, commercially available as Novamet® Type 4SP-10, from Inco Special Products, Inco Limited, Wyckoff, N.J.). The results were substantially similar to those reported in Example 2. Hydrogen was again generated in Step A and Step C. Nickel is a less active catalyst than platinum and as a result the The process of paragraph 85, wherein said oxygenated hydrocarbon is selected from the group consisting of a saccharides, celluloses, starches, sugars, alcohols, ethers, carboxylic acids, aldehydes, ketones, biomass and mixtures thereof.

The process of paragraph 88, wherein said saccharide is selected from the group consisting of monosaccharides, disaccharides, oligosaccharides, polysaccharides and mixtures thereof.

The process of paragraph 88, wherein said alcohol is selected from the group consisting of $C_1$-$C_6$ alcohols and mixtures thereof.

The process of paragraph 90, wherein said alcohol is selected from methanol, ethanol and mixtures thereof.

The process of paragraph 91 wherein said alcohol is methanol.

The process of paragraph 88, wherein said ether is selected from dimethyl ether, methylethyl ether, diethyl ether and mixtures thereof.

The process of paragraph 93, wherein said ether is dimethyl ether.

The process of paragraph 88, wherein said oxygenated hydrocarbon is a mixture of methanol and dimethyl ether.

The process of paragraph 85, wherein said alkaline electrolyte is selected from the group consisting of metal hydroxides, carbonates, bicarbonates and mixtures thereof.

The process of paragraph 85, wherein said catalyst is selected from the group consisting of compounds, complexes, alloys and mixtures thereof comprising a metal selected from the Group VIII transition metals of the Periodic Table of the Elements.

The process of paragraph 97, wherein said catalyst further comprises at least one metal selected from the metals of Group IB, Group IIB, Group VIIB, and mixtures thereof.

The process of paragraph 97, wherein said catalyst is selected from the group consisting of platinum, nickel, palladium, rhodium, iridium, cobalt, ruthenium, iron and mixtures thereof.

The process of paragraph 98, wherein said catalyst further comprises a metal selected from the group consisting of copper, zinc, silver and rhenium.

The process of paragraph 97, wherein said catalyst is supported on or in a conductive or non-conductive material selected from the group consisting of metals, metal oxides, silica, alumina, silica-alumina, zirconia, titania, ceria, carbon, silicon carbide, silicon nitride, silicon boride and mixtures thereof.

The process of paragraph 101, wherein said support is in a form selected from the group consisting of beads, powders, coatings extruded substrates, monoliths and mixtures thereof.

The process of paragraph 85, wherein said oxidizable organic substance and said alkaline electrolyte are reacted in the presence of water.

The process of paragraph 96, wherein said alkaline electrolyte is selected from the group consisting of alkali metal or alkaline earth metal: hydroxides, carbonates, bicarbonates and mixtures thereof.

The process of paragraph 104, wherein the metal of said alkaline electrolyte is selected from the group consisting of sodium, lithium, potassium, cesium, rubidium and mixtures thereof.

The process of paragraph 85 wherein regeneration is conducted at a temperature of about 85° C. to about 200° C., or alternatively at a temperature of about 150° C. to about 170° C. or about 85° C. to about 100° C.

The process of paragraph 85 conducted continuously.

All documents, including patents, described herein are incorporated by reference herein, including any priority documents and/or testing procedures. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A process for producing hydrogen gas comprising contacting in the liquid phase at least one oxidizable organic substance in the presence of a mixture comprising at least one conductive catalyst and an aqueous alkaline metal carbonate electrolyte, wherein at least one metal bicarbonate composition is produced by reaction of said electrolyte and is continuously regenerated and reintroduced as the aqueous alkaline metal carbonate electrolyte, and said at least one oxidizable organic substance is methanol.

2. The process of claim 1, wherein said alkaline metal carbonate electrolyte is selected from the group consisting of carbonates, bicarbonates and mixtures thereof.

3. The process of claim 1, wherein said catalyst is selected from the group consisting of compounds, complexes, alloys and mixtures thereof comprising at least one metal selected from the Group VIII transition metals of the Periodic Table of the Elements and optionally further comprises at least one metal selected from the metals of Group IB, Group IIB, Group VIIB, and mixtures thereof.

4. The process of claim 3, wherein said catalyst is selected from the group consisting of platinum, nickel, palladium, rhodium, iridium, cobalt, ruthenium, iron and mixtures thereof and optionally further comprises a metal selected from the group consisting of copper, zinc, rhenium and silver.

5. The process of claim 3, wherein said catalyst is supported on or in a conductive or non-conductive material selected from the group consisting of metals, metal oxides, silica, alumina, silica-alumina, zirconia, titania, ceria, carbon, silicon carbide, silicon nitride, silicon boride and mixtures thereof, said support optionally in a form selected from the group consisting of beads, powders, coatings extruded substrates, monoliths and mixtures thereof.

6. The process of claim 1, wherein said alkaline metal carbonate electrolyte is selected from the group consisting of alkali metal or alkaline earth metal:
carbonates, bicarbonates and mixtures thereof and said metal is selected from the group consisting of sodium, lithium, potassium, cesium, rubidium and mixtures thereof.

7. The process of claim 1, further comprising the step of substantially separating hydrogen formed during the contacting step from reaction by-products.

8. The process of claim 7, wherein said separation is an absorption step, said by-product comprises $CO_2$ and said absorption compromises contacting said hydrogen and $CO_2$ with an aqueous solution comprising an absorbing amount of a compound selected from the group consisting of at least one alkali metal carbonate, at least one alkaline earth metal carbonate and mixtures thereof, at a temperature of about 100° C. to about 350° C. and thereby reactively absorbing said $CO_2$ and producing a metal bicarbonate as a further byproduct.

9. The process of claim 8, wherein said absorption step comprises the further use of at least one promoting agent selected from the group consisting of amines, borates, arsenates, glycines, piperazines and mixtures thereof.

10. The process of claim 1, wherein said pressure is about 10 atm to about 100 atm.

11. The process of claim 1, wherein said electrolyte is regenerated in a reactor by contacting said electrolyte composition with steam, wherein said mixture further comprises at least one promoting agent selected from the group consisting of amines, borates, arsenates, glycines, piperazines and mixtures thereof.

12. The process of claim 6, wherein the regeneration is conducted at a pressure of about 0.3 atm to about 200 atm.

13. The process of claim 1 conducted in a first reactor, said electrolyte is continuously regenerated in a second reactor and said regenerated electrolyte is continuously introduced into said first reactor.

14. The process of claim 13 wherein regeneration is conducted at a temperature of about 85° C. to about 200° C.

15. A process for producing hydrogen gas comprising contacting in the liquid phase at least one oxidizable organic substance in the presence of a mixture comprising at least one conductive catalyst and an aqueous alkaline metal carbonate electrolyte, wherein at least one metal bicarbonate composition is produced by reaction of said electrolyte and is regenerated and said at least one oxidizable organic substance comprises an oxygenated hydrocarbon, a step of substantially separating hydrogen formed during the contacting step from reaction by-products, wherein said separation is an absorption step, said by-product comprises $CO_2$ and said absorption comprises contacting said hydrogen and $CO_2$ with an aqueous solution comprising an absorbing amount of a compound selected from the group consisting of at least one alkali metal carbonate, at least one alkaline earth metal carbonate and mixtures thereof, at a temperature of about 100° C. to about 350° C. and thereby reactively absorbing said $CO_2$ and producing a metal bicarbonate as a further byproduct, and wherein the metal bicarbonate-containing composition of said absorption step is contacted with steam in a reactor to regenerate said metal carbonate.

16. A process for producing hydrogen gas comprising contacting in the liquid phase at least one oxidizable organic substance in the presence of a mixture comprising at least one conductive catalyst and an aqueous alkaline metal carbonate electrolyte, wherein at least one metal bicarbonate composition is produced by reaction of said electrolyte and is regenerated and said at least one oxidizable organic substance comprises an oxygenated hydrocarbon, a step of substantially separating hydrogen formed during the contacting step from reaction by-products, wherein said separation is an absorption step, said by-product comprises $CO_2$ and said absorption comprises contacting said hydrogen and $CO_2$ with an aqueous solution comprising an absorbing amount of a compound selected from the group consisting of at least one alkali metal carbonate, at least one alkaline earth metal carbonate and mixtures thereof, at a temperature of about 100° C. to about 350° C. and thereby reactively absorbing said $CO_2$ and producing a metal bicarbonate as a further byproduct, and wherein the metal bicarbonate-containing composition of both said absorption step and said hydrogen production step are contacted with steam in a reactor to regenerate said metal carbonate.

17. A process for producing hydrogen gas comprising contacting in the liquid phase at least one oxidizable organic substance in the presence of a mixture comprising at least one conductive catalyst and an aqueous alkaline metal carbonate electrolyte, wherein at least one metal bicarbonate composition is produced by reaction of said electrolyte and is regenerated and said at least one oxidizable organic substance comprises an oxygenated hydrocarbon, wherein
(A) hydrogen gas is generated in a reactor having a top and bottom, wherein said at least one oxidizable organic substance is introduced into said reactor at a point substantially midway between said top and bottom;
(B) said electrolyte comprising at least one metal carbonate is introduced into said reactor at a point substantially at the top of said reactor such that said electrolyte and said hydrogen gas flow substantially countercurrent to one another, thereby resulting in the production of at least one metal bicarbonate composition; and
(C) said at least one metal bicarbonate composition is regenerated.

18. A process for producing hydrogen gas comprising contacting in the liquid phase at least one oxidizable organic substance in the presence of a conductive catalyst and an alkaline electrolyte, wherein:
(A) hydrogen gas is generated in a first reactor having a top and bottom, wherein said at least one oxidizable organic substance is introduced into said first reactor at a point substantially midway between said top and bottom;
(B) an alkaline electrolyte solution is introduced into said first reactor at a point substantially at the top of said reactor such that said metal carbonate solution and said hydrogen gas flow substantially countercurrent to one another, thereby resulting in the production of at least one metal bicarbonate composition;
(C) said at least one metal bicarbonate composition is continuously regenerated in a second reactor to produce metal carbonate that is continuously introduced into said first reactor;
wherein said at least one oxidizable organic substance is an oxygenated hydrocarbon; and
wherein said alkaline electrolyte consists of carbonates, bicarbonates and mixtures thereof.

19. The process of claim 18, wherein said oxygenated hydrocarbon is methanol.

20. The process of claim 18, wherein said catalyst is selected from the group consisting of compounds, complexes, alloys and mixtures thereof comprising at least one metal selected from the Group VIII transition metals of the Periodic Table of the Elements and optionally further comprises at least one metal selected from the metals of Group IB, Group IIB, Group VIIB, and mixtures thereof.

* * * * *